United States Patent Office 3,741,728
Patented June 26, 1973

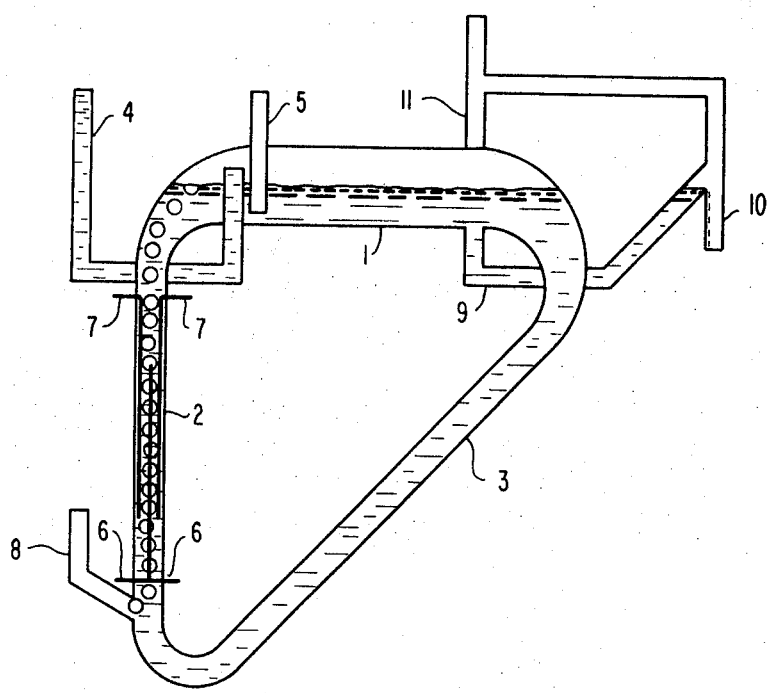

3,741,728
PROCESS AND APPARATUS FOR THE CONTINUOUS DETERMINATION OF WATER IN GASES
Eberhard Sistig, Marl, and Karl-Heinz Reinermann, Dulmen, Germany, assignors to Chemische Werke Huls Aktiengesellschaft, Marl, Germany
Filed Jan. 24, 1972, Ser. No. 219,947
Claims priority, application Germany, Jan. 23, 1971, P 21 03 089.7
Int. Cl. B01k 3/00; G01n 31/16
U.S. Cl. 23—232 E       7 Claims

ABSTRACT OF THE DISCLOSURE

Process for conducting a continuous water determination in gases with the aid of coulometric titration according to the "dead-stop" method with Karl Fischer reagent, which comprises effecting circulatory motion of the titration liquid in a closed titration system by continuously supplying an anhydrous gas containing at least 5% by volume of oxygen to the titration liquid, the titration system having a closed loop-like configuration.

---

This invention relates to a process and apparatus for conducting a continuous water determination in gases with the aid of coulometric titration according to the "dead-stop" method with "Karl Fischer" reagent.

In many modern chemical processes, the use of extremely anhydrous gases is required. There is often the demand that the water content of these gases be no more than a few parts by weight p.p.m.

(part per million=$10^{-6}$).

On the other hand, continuous processes require, for the control and regulation thereof, continuous measurements of parameters which are of interest. Both of these requirements in combination result in the demand for an apparatus for the continuous determination of minimum amounts of water in gases.

Measuring devices are known, with the aid of which a continuous analysis of traces of water is conducted by the use of various physical-chemical methods. Among such devices are those employing the method of coulometric titration. These devices use the so-called "dead-stop" method for the continuous determination of the water content. (This method is described in "Water Determination With Karl Fischer Solution" by Dr. E. Eberius, in the "Monographs on Applied Chemistry and Chemical Engineer Technology," No. 65, published by Chemie G.m.b.H., Weinheim/Bergstrasse, 1958, p. 58; as well as in "Coulometric Analysis," by Dr. K. Abresch, set forth in the same monographs (No. 71) published in 1961, p. 40).

An essential part of the coulometric titration devices is the titrating system which includes a vessel wherein the titration is conducted; the vessel is equipped with a feed pipe and electrodes.

The construction and mode of operation of this titrating system substantially influence the manufacturing costs and the dimensions of the entire measuring device for the continuous determination of water.

In Zeitschrift fur analytische Chemie, vol. 186, pp. 176–186, particularly FIGS. 4 and 5, a device and an associated titration system are described for effecting the coulometric titration. The titration system consists of a vertically constructed vessel having in its interior an electrode support provided with current contacts. The electrode support, which is axially constructed and helically fashioned at its lower end, rotates in the liquid and thus rapidly feeds the liquid to an indicator system; this feeding procedure is accomplished by the support taking in the reagent solution from a container disposed alongside. The solution, in turn, entrains the sample solution; namely, an organic, water-containing liquid, from a storage tank connected thereto during passage to the titration system.

In order to obtain a satisfactory mixing of the reagent solution during this step, a vertically disposed mixing screw is disposed in the vessel for the reagent solution; this screw rotates in the opposite direction than that of the electrode support.

Another disclosure (German patent application P 15 98 312.7-52) describes a measuring arrangement for the continuous determination of minute amounts of water in gases or organic fluids. This proposal employs two series-connected titration systems; one for the preliminary titration, and the second for the main titration. Both systems employed are vessels constructed as glass beakers.

In the preliminary titration vessel, the electrodes, i.e., the indicator electrode and generator electrode pairs, are immersed from above. These electrodes are spatially separated and mounted in the proximity of the beaker wall. The liquid sample is added dropwise to the main titration system from above into the titration liquid of the main titration vessel. The main titrate system exhibits electrode pairs which are flatly installed in the beaker bottom. Both titration systems are supplied with the purging air which removes the hydrogen produced during the analysis. Also, both titration systems comprise magnetic agitator rods mechanically moved by a magnetic coupling on the beaker bottom; these rods serve the purpose of preventing, by thorough stirring, the formation of local differences in concentration of the iodine in the liquid and of avoiding the formation of a gaseous envelope around the platinum electrodes. In order to enhance the mixing effect, it is recommended in this publication to provide the main titration vessel with bubble means for interrupting the flow of liquid therein.

The first-described measuring arrangement for the titration of water is very expensive from a structural viewpoint. The complete rotating electrode system requires electrical contacting to the outside, which is seldom free of errors. The use of two rotational drives requires the use of at least one electric motor and the motor, in turn, makes it necessary to provide additional means to meet the regulations regarding explosion protection when used in plants where danger of explosion exists.

The simpler, known measuring device, likewise, comprises two agitator motors and therefore also exhibits the disadvantages of requiring additional components in explosion-endangered areas.

This invention is based on the problem of developing a simple titration process and provides an economical and efficient apparatus for the conductance of this process, which does not exhibit the disadvantages of the known conventional titration systems.

This problem is solved, according to the invention, by providing that the titration liquid in the titration system is set into circulatory motion in a closed stream by a continuously fed anhydrous gas containing at least 5% by volume of oxygen.

It will be understood that the composition of the Karl Fischer solution used as titration liquid is as follows: 5% by weight of the solution of 100 grams $SO_2$ in 800 grams pyridine together with 5% by weight of the solution of 127 grams $L_2$ in 1000 grams methanol diluted with 90% by weight methanol.

A further development of the process of this invention resides in that the coulometric titration is conducted in a liquid stream having a constant minimum velocity, averaged over the cross section of the conveying conduit, of 20 cm./sec.

A further advantageous feature for the present invention is that air can be used as the anhydrous gas containing the oxygen.

The advantages obtained by this invention also reside in the simple construction of the apparatus which insure freedom from maintenance. Because of the fact that rotating parts and thus drive means are entirely omitted, the additional expenditure to provide explosion protection when using the device in explosion-endangered plants is likewise eliminated. A further advantage resides in that the mixing of the reagent is no longer carried out with the aid of agitators or even additional flow-impeding means, but rather is effected by the movement of the titration liquid within a loop of the closed titration system, caused by the air fed thereto.

The construction of the titration system as a closed space or loop with longitudinally wettable electrode wires makes it possible to attain a filling volume which is smaller (by a factor of 3) than that customary in conventional devices. In particular, the apparatus may be constructed to have a volume of about 35 cc.; this results in a compact structure which provides, as a further advantage, a low consumption of reagent in operation.

One embodiment of the apparatus of this invention for conducting the process of continuous determination of water in gas is illustrated in the accompanying drawing and is set forth in greater detail in the following description.

The titrating vessel of this invention (as shown) consists of a closed space (or loop) composed of pipes and provided with connecting orifices and tubes or capillaries extending into this space. These elements may be formed of glass or other material resistance and inert to the titrating solution. Preferably, glass is employed. This entirely closed space comprises a first tubular portion 1 of larger diameter and a second tubular portion 2 with a diameter which is usually smaller than the first by a factor of about 3. This second portion adjoins the first portion directly at one of its ends and is arranged at right angles to the axis of the first portion. The other end of portion 1—which constitutes the feeding zone for the gaseous substance to be tested and the reagent—is connected with the other end of portion 2—this portion constituting the electrode chamber—with the aid of a pipe or conduit 3. Pipe 3 is kept as short as possible, so that the entire titration system of this invention is provided with an appearance similar to a right-angle triangle. The diameter of first portion may be equal to the diameter of conduit 3. It is particularly advantageous to have as little titration solution in the system as possible and to cycle this solution as rapidly as possible.

The titration system is arranged so that the first portion 1 providing the feed zone is disposed horizontally, and the second portion 2 providing the electrode chamber is positioned vertically. Thus, the plane of intersection through the axes of both portions 1 and 2 of the titrating vessel lies in the vertical plane.

Through the feed conduit 4, the reagent solution is introduced from the bottom into the feed zone 1. The sample gas is fed through the feed pipe 5 extending into zone 1 from above into the proximity of the lower inner wall of zone 1.

A pair of indicator electrodes 6 and a pair of generator electrodes 7, both pairs being made of platinum wire, are extended under tension into portion 2 along the inner wall thereof and are preferably melted into the glass walls forming portion 2 at their ends. Below the electrodes, the electrode chamber 2 is connected to a feed line 8.

When initiating the operation of the titration system for the first time, it is filled with the titration reagent through the feed conduit 4 until a liquid level is obtained in the feed zone 1 which is determined by the drain 9 at the lower part of the feed zone and by the overflow outlet 10 in communication therewith. Then, the reagent is introduced continuously into the feed zone in the amount visible at the overflow.

Through the feed pipe 8, predried air in metered amounts is continuously added to the titration system; the air rises in the form of bubbles through the vertical electrode chamber 2 and leaves the feed chamber through the connection pipe 11. During this process, the air fed to the system sets the liquid in the electrode chamber 2 and thus the entire filling of the titration system 1, 2, 3, with the titration liquid, into a circulatory motion in a closed stream.

At this point, the gas to be examined for its water content is introduced into the feed zone 1 via the feed pipe 5 which is now immersed in the reagent liquid; this gas bubbles through the moving reagent liquid into the gaseous space above the liquid level, from which it escapes, together with gaseous products of the reaction and together with the air, through connecting pipe 11 from the feed zone 1.

Now, at this stage of the process, the determination of the water content can be conducted in the conventional manner by coulometric titration with Karl Fischer reagent in accordance with the "dead-stop" method.

The electrode wires pertaining to one pair of electrodes are disposed in a radially symmetrical manner. The adjacent electrode wires pertaining, respectively, to the other pair of electrodes, are arranged when viewed along the cross section of the electrode chamber, at a distance rotated through an arc of 90°.

In addition, the indicator electrodes extend in the chamber so that they are offset by one-half of their length with respect to the generator electrodes. This ensures that the indication produced by the indicator electrodes is not interfered with by the iodine produced on the generator electrodes.

In order to effect an early response of the generation process, which is controlled by the indicator electrodes, the two electrode pairs are offset with respect to each other in such a manner that the generator electrodes, as seen in the flow direction of the titration liquid, are disposed downstream of the indicator electrodes.

It was found that the determination of the proportion of water in gases can be accomplished down to a measuring range of about 0 to about 25 p.p.m. with an accuracy of ±1 p.p.m., if anhydrous, but oxygen-containing gas with an oxygen content of at least about 5% by volume, is continuously fed to the filling of the titration system. As such a gas, dried air is readily available.

The air introduced into the filled titration system through connecting pipe 8 fulfills still other functions. First, the air conducts the products of the water titration (which are formed in the feed zone and along the way to the electrodes) to the electrodes. Secondly, the air prevents the occurrence of local differences in iodine concentration in the zone of the electrodes, which are undesirable in the "dead-stop" method, as well as the formation of gas envelopes or bubbles at the electrodes.

In order to accomplish a flawless measuring procedure, it is necessary to adjust the system to provide a constant velocity of the liquid in the electrode chamber, averaged over the cross section of the pipe, to at least about 20 cm./sec. by an appropriate feed of air.

Furthermore, the air serves as a carrier gas which discharges gaseous products of the titration reaction from the feed zone.

The process of this invention will be further understood by reference to the following example.

EXAMPLE

The example illustrates the measurement of water in ethylene gas using an apparatus as shown in the drawing. The essential apparatus data of the arrangement of the titration system of this invention, as well as process data for the conductance of the measuring step, are indicated.

The total volume of the titration vessel, made of glass, was about 35 cc.; the electrode chamber 2 had an internal diameter of 5.6 mm., and a length of about 100 mm. The electrodes were made of platinum wire of a diameter of 0.6 mm., and the length of the wires was, respectively, 65 mm.

The amount of air fed to the system was 100 cm.$^3$/min. at a temperature of 20° C. and an initial feed pressure of 250 mm. water column. The circulating velocity of the liquid in the titration vessel was, in the electrode chamber, 23 cm./sec.; the temperature of the titration reagent was about 20° C.

The feed zone 1 had an internal diameter of 19 mm. and a length of about 120 mm. The amount of reagent fed thereto was about 0.5 cc./min. The reagent consisted of 10% by weight of Karl Fischer solution and 90% by weight of methanol. The amounts of water added in the reagent were between 0 and 150 parts by weight p.p.m., depending on the moisture content of the methanol employed.

The voltage at the indicator electrodes was 20 millivolts and at the generator electrodes the voltage was 0–1.5 v.

With the aid of this titration system, traces of $H_2O$ of between 0 and 25 p.p.m. in the ethylene gas were measured with an accuracy of ±1 p.p.m.

It will be appreciated that it is essential to employ an anhydrous carrier gas containing at least 5% $O_2$ and that the $O_2$ content can be at least as much as about 21% (e.g. air). Air is particularly effective since it is readily available and diluents such as $N_2$, argon and the like do not interfere with the desired titration measurements.

It will also be appreciated that the water contents of many different gases can be determined in accordance with this invention. Exemplary of these gases are air, nitrogen, propylene, butylene, butadiene, hydrogen, and vinyl chloride. In addition, gases like methane, ethane, propane and butane may also be evaluated for their water content.

While the novel principles of the invention have been described, it will be understood that various omissions, modifications and changes in these principles may be made by one skilled in the art without departing from the spirit and scope of the invention.

What is claimed is:

1. In a process for conducting the continuous water determination in gases with the aid of coulometric titration according to the "dead-stop" method with Karl Fischer reagent, the improvement which comprises conducting said determination in a titration system in the form of a closed loop and effecting circulatory motion of the titration liquid in said system by continuously supplying an anhydrous gas containing at least 5% by volume of oxygen to the titration liquid.

2. The process of claim 1, in which the coulometric titration is conducted in a liquid stream having a constant minimum velocity of 20 cm./sec., averaged over the cross section of the titration system in a zone wherein measurement of the gas concentration by titration is effected.

3. The process of claim 1, in which the oxygen-containing anhydrous gas is air.

4. An apparatus for conducting a continuous water determination in gases by coulometric titration with Karl Fischer reagent, said apparatus comprising a closed space formed of continuous conduit means, said conduit means defining a first portion and a second portion joined to each other at a right angle, said first portion defining a feed zone, feed means for introducing a titration reagent into said feed zone, liquid level means for maintaining a predetermined level of titration reagent within said feed zone, a sample gas feed means connected to the feed zone, a gas outlet means for allowing the escape of gases from said feed zone, said second zone forming an electrode chamber, indicator electrode means and generator electrode means located in said chamber, said means for introducing a carrier gas into said electrode chamber to effect circulatory movement of the titration reagent, and said electrode chamber being connected via a third conduit portion with the feed zone to form said closed space.

5. The apparatus of claim 4, in which the generator electrode means are offset with respect to the indicator electrode means by one-half their length toward the neighboring end of the feed zone.

6. The apparatus of claim 4, wherein said conduit means are formed of glass and said electrodes are embedded into the walls of the electrode chamber.

7. The apparatus of claim 6, wherein the electrodes are platinum wires.

References Cited
UNITED STATES PATENTS 3,131,133   4/1964   Barendrecht _____ 204—195 T X MORRIS O. WOLK, Primary Examiner R. M. REESE, Assistant Examiner U.S. Cl. X.R.

204—1 T, 195 T